United States Patent [19]

Azadegan et al.

[11] Patent Number: 5,128,758
[45] Date of Patent: Jul. 7, 1992

[54] METHOD AND APPARATUS FOR DIGITALLY PROCESSING A HIGH DEFINITION TELEVISION AUGMENTATION SIGNAL

[75] Inventors: Faramarz Azadegan, Ossining; Eberhard H. Fisch, Yonkers, both of N.Y.

[73] Assignee: North American Philips Corporation, New York, N.Y.

[21] Appl. No.: 361,523

[22] Filed: Jun. 2, 1989

[51] Int. Cl.$^5$ .................... H04N 7/13; H04N 11/04
[52] U.S. Cl. ........................ 358/133; 358/13; 358/140; 358/141
[58] Field of Search .............. 358/133, 135, 136, 140, 358/141, 12, 13

[56] References Cited

U.S. PATENT DOCUMENTS

| | | | |
|---|---|---|---|
| 4,665,436 | 5/1987 | Osborne | 358/135 |
| 4,694,338 | 9/1987 | Tsinberg | 358/141 |
| 4,782,387 | 11/1988 | Sabri | 358/135 |
| 4,873,567 | 10/1989 | Tsinberg | 358/12 |
| 4,890,283 | 12/1989 | Tsinberg | 370/84 |
| 4,920,414 | 4/1990 | Remus | 358/133 |
| 4,945,411 | 7/1990 | Cavallerano | 358/141 |

*Primary Examiner*—Howard W. Britton
*Attorney, Agent, or Firm*—Michael E. Marion

[57] ABSTRACT

A method and apparatus for digital encoding are described for compressing the augmentation channel signals (chrominance and luminance signals for panel information and high frequency luminance and line difference signal) so that this information can be transmitted in a 3 MHz wide RF channel using a digital transmission scheme such as QPSK. Analog signal components are sampled and converted to digital signals. Each of the signals is fed into a separate coder which reduces the number of bits/pixel required to reconstruct the original signal. Compression is achieved by quantization and removal of redundancy. The compression scheme is based on the use of DCT together with VLC. Each augmentation signal has its own coder, which is adapted to the unique statistics of this signal.

11 Claims, 13 Drawing Sheets

BUFFER REGULATION PROCEDURE

WEIGHTS FOR PANELS

METHOD AND APPARATUS FOR DIGITALLY PROCESSING A HIGH DEFINITION TELEVISION AUGMENTATION SIGNAL

RELATED PATENTS AND APPLICATIONS

U.S. Pat. No. 4,694,338, issued Sep. 15, 1987; U.S. patent application Ser. No. 084,968, filed Aug. 13, 1987; now U.S. Pat. No. 4,873,567; U.S. patent application Ser. No. 122,148, filed Nov. 17, 1987; now abandoned; U.S. patent application Ser. No. 123,031, filed Nov. 19, 1987; now U.S. Pat. No. 4,890,283; U.S. patent application Ser. No. 239,091, filed Aug. 31, 1988; U.S. patent application Ser. No. 239,096, filed Aug. 31, 1988; U.S. patent application Ser. No. 239,148, filed Aug. 31, 1988; now U.S. Pat. No. 4,945,411; U.S. patent application Ser. No. 250,019, filed Sep. 27, 1988; now U.S. Pat. No. 4,920,414.

The above-referenced cases have a common assignee and are all incorporated by reference herein.

BACKGROUND OF THE INVENTION

The present invention relates to a method and apparatus for digitally processing the components of an augmentation signal as part of a multi-channel high definition television (HDTV) delivery system. Such a system has been described for example in U.S. Pat. No. 4,694,338 which is incorporated by reference herein. In such a system, an HDTV source signal, having for example a 16:9 aspect ratio and a 525 sequentially scanned or 1050, 2:1 interlaced line structure, is divided into two signals. A conventional television signal, for example an NTSC encoded signal receivable on a standard broadcast receiver, is transmitted over a regular television transmission medium, for example a standard television channel and an augmentation signal providing the additional wider aspect ratio and high resolution information of the source signal is transmitted over a second transmission medium, for example a second television channel or part of one. A high definition television receiver can then be used to receive and combine both signals into a high definition television display.

SUMMARY OF THE INVENTION

The applications referred to hereinabove describe systems utilizing analog augmentation signal configurations. For example, the systems described in U.S. patent applications 239,096 and 239,148 (both filed on Aug. 31, 1988) comprise embodiments using a standard 6 MHz wide NTSC channel and a 3 MHz wide augmentation channel which could be transmitted on a presently unassigned television channel. The only available terrestrial channel capacity however, appears to be the so called "taboo" channels which are currently restricted for television transmission. If however, the amount of power needed to transmit the augmentation signal on such a channel could be effectively reduced, use of these "taboo" channels could become practical.

The instant application comprises a digital processing method and apparatus which digitally encodes the augmentation signal components compressing them so that the information they provide can be transmitted in a narrow RF channel having for example a 3 MHz wide bandwidth, using a digital transmission scheme such as QPSK (quadraphase shift keying). This permits a significant reduction of transmitted power on the augmentation channel, subsequently reducing the amount of interference to other channels using the same frequency band. Digital transmission of the augmentation signal not only permits the use of reduced power, but also enables taking advantage of the various known error detection/correction schemes, so that a better quality signal can be achieved.

A major disadvantage of digital transmission is, however, the increase in the transmission bandwidth necessary. The increased bandwidth requires either the use of a channel with a wider bandwidth or implementation of data compression schemes to reduce the required bandwidth. The invention comprises an approach for encoding the enhancement signals based on the latter solution.

Extensive research in the area of image coding has shown that two-dimensional (2-D) discrete block cosine transform (DCT) encoding has attractive performance compared to other encoding techniques while being practical for hardware implementation. However, these investigation have traditionally dealt with standard full-band signals. The compression scheme used herein is a modified version of one described in a paper entitled "Adaptive Intra/Inter Frame DCT Coding of TV Pictures", June 1988, C. Remus (LEP Philips, France) and the implementation of a two-dimensional DCT with VLC for full band two-dimensional signals (regular images) was first introduced by W. Chen and W. K. Pratt in a paper entitled "Scene Adaptive Coder" (IEEE Transaction on Communications, March 1984). The results of these studies cannot be readily extended to the encoding of augmentation signals which in part possess only high frequency content. These articles are incorporated by reference herein.

Augmentation signal components derived using for example, an HDNTSC encoder such as the one described in U.S. patent application 084,968, filed Aug. 13, 1987 and an encoder first described in U.S. Pat. No. 4,694,338 (issued on Sep. 15, 1987), and comprising, for example, a luminance panel signal $Y_p$, two chrominance panel signals ($I_p$ and $Q_p$), a high frequency luminance signal YH and a line difference signal LD, are those processed in accordance with the invention. The instant invention takes these augmentation signal components, samples them and converts them into for example, 8 bit per pixel digital signals. Each of these digital signals is then fed into a separate coder which reduces the number of bits per pixel required to reconstruct the original signal components. This compression is achieved by quantization and removal of redundancy. By quantization, we mean the elimination of certain information. The compression scheme is based on the use of DCT (discrete cosine transform) processing in combination with VLC (variable length coding) and each augmentation signal component has its own coder, which is adapted to its unique characteristics.

DETAILED DESCRIPTION OF THE INVENTION

Figure 1:
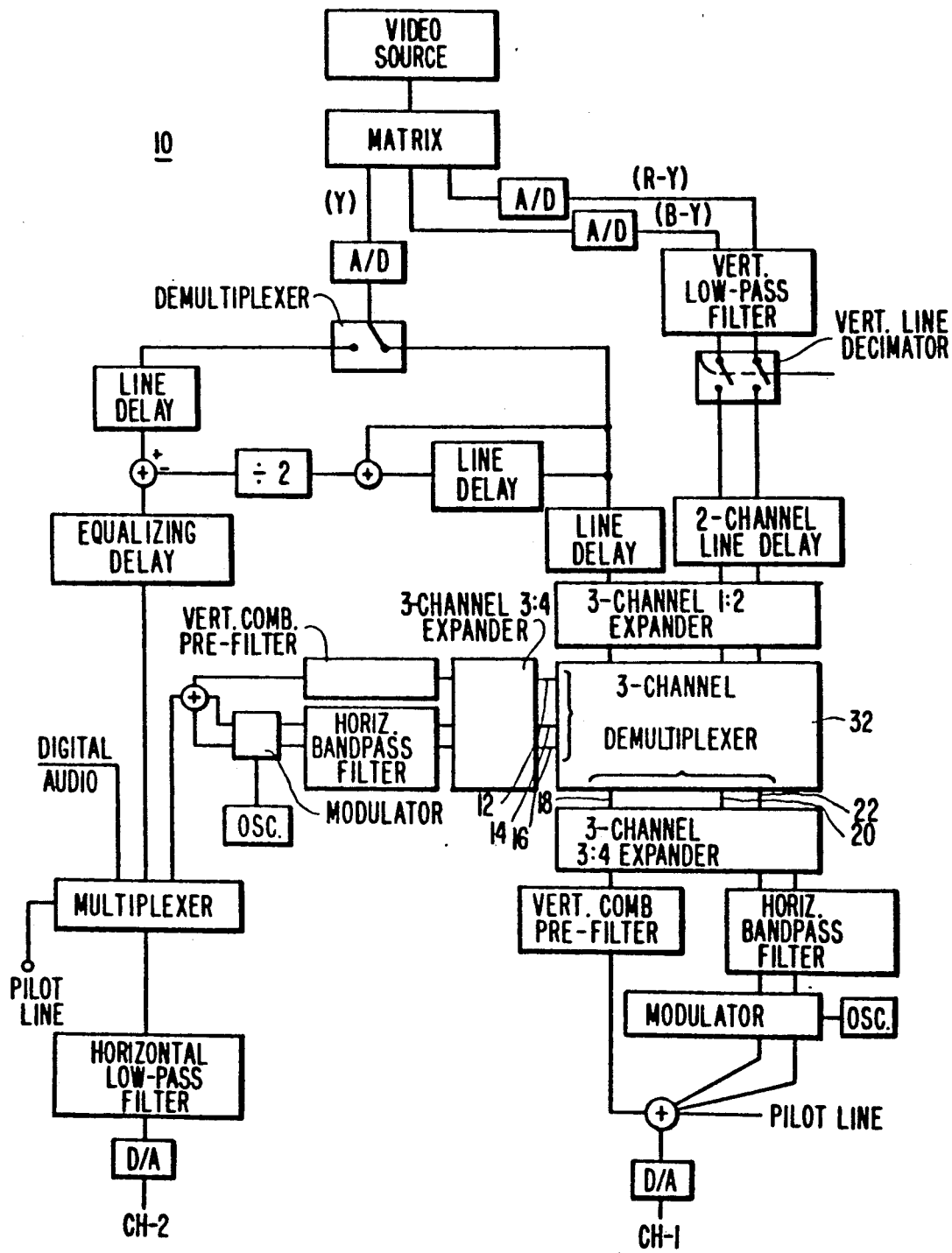
FIG. 1 is a diagram of an encoder described in U.S. Pat. No. 4,694,338.

FIG. 1 is one embodiment of an encoder which can be used to derive luminance and chrominance signal components for both center and panel portions of a high definition television source signal. The operation of this encoder 10 and its use in the derivation of an augmentation signal is fully described in the '338 patent in which this figure appears as FIG. 4. As explained therein, a HDTV source is processed and outputs 18, 20 and 22 of the 3-channel demultiplexer 32 provide respectively, a luminance ($Y_c$), and two chrominance components, for example $Q_c$ and $I_c$, for the center portion of the HDTV source. This center portion presents picture information which, as taught by the '338 patent, is then NTSC encoded and transmitted over one standard television channel. The outputs 12, 14 and 16 of 3-channel demultiplexer 32 provide respectively $Y_p$, $Q_p$ and $I_p$ components for the panels derived from the HDTV source signal.

Figure 2:
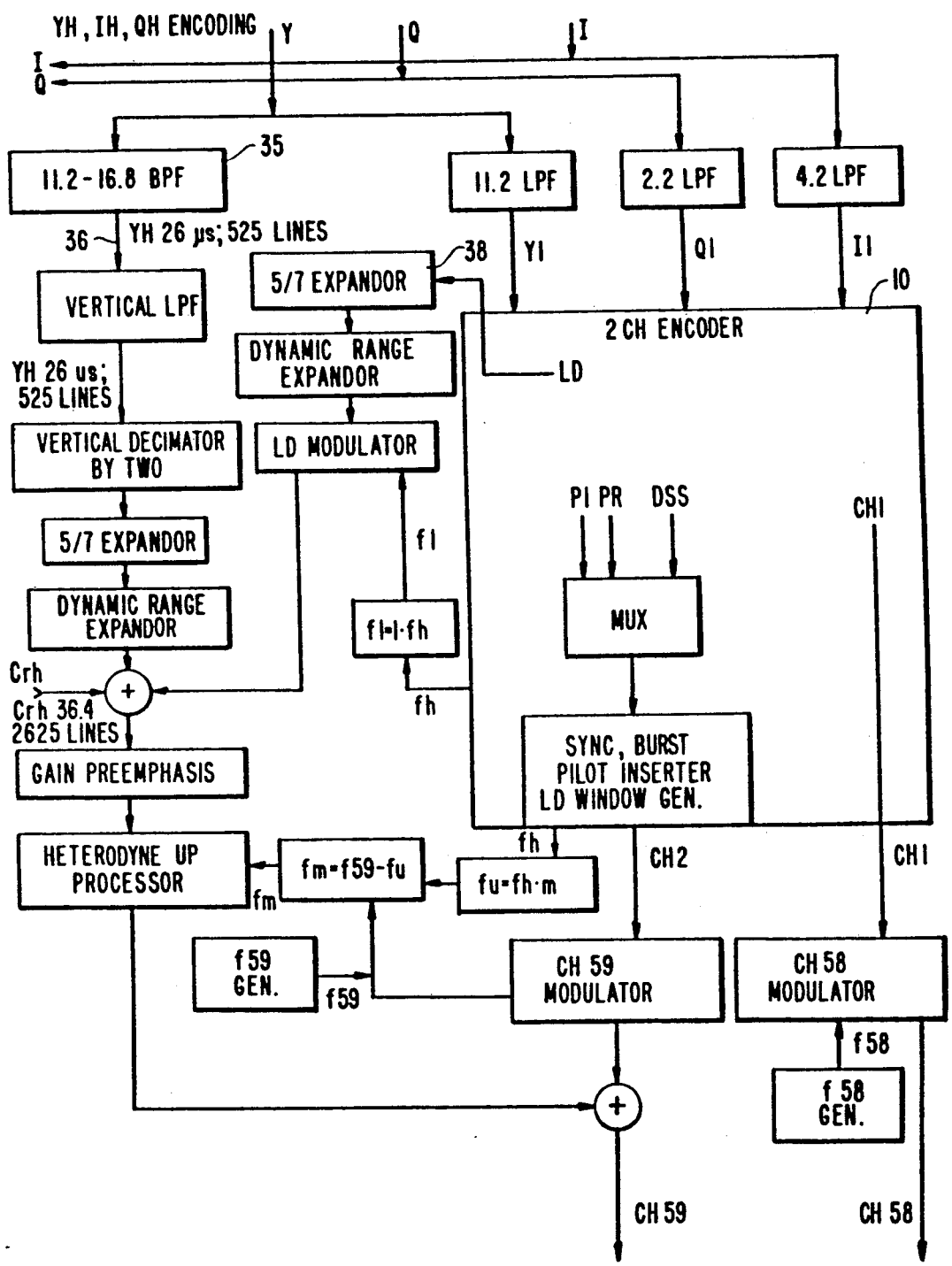
FIG. 2 is a diagram of a high definition NTSC (HDNTSC) encoder described in U.S. patent application No. 084,968.

FIG. 2 describes an HDNTSC encoder which utilizes the encoder 10 in conjunction with band pass filter 35 to derive a high frequency luminance component YH from the HDTV source signal. This encoder is disclosed as FIG. 2a of the '968 application which describes a system providing extended horizontal resolution of luminance and chrominance in a high definition television system. The YH component 36 is available at the output of the bandpass filter (BPF) 35. A line difference (LD) signal component is available at output 38.

The described embodiment of the instant invention provides for the processing and transmission of the derived augmentation signal in an approximately 3 MHz wide RF channel. The augmentation signal consists, for example, of the following signal components: $Y_p$, $I_p$, $Q_p$, LD and YH. It should be noted that in the analog two channel system described in the '096 application the I, and Q signals for panels are modulated in quadrature to produce a signal chrominance signal, whereas here separate I and Q signal components are provided for in the augmentation signal.

Figure 3:
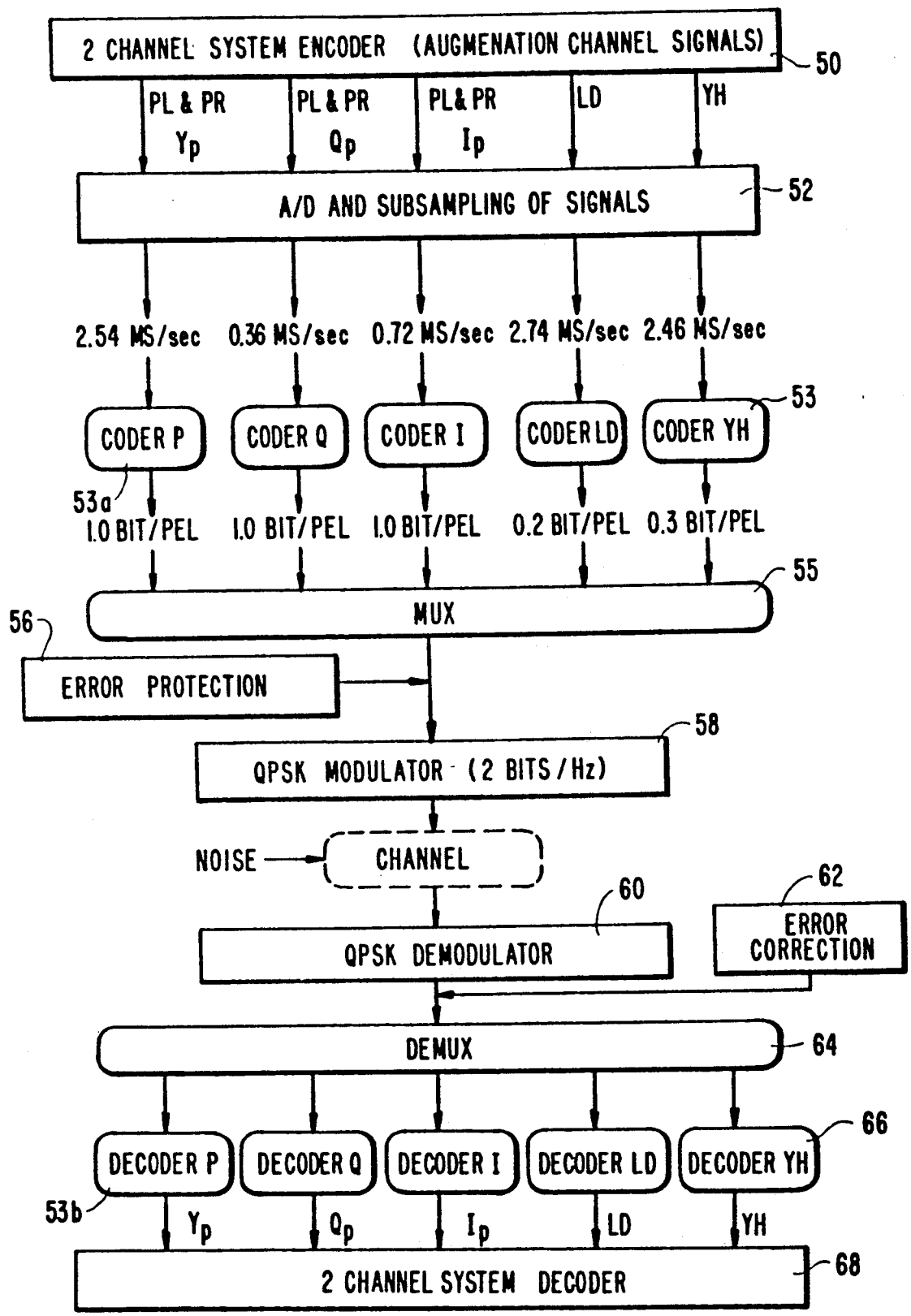
FIG. 3 is a flow diagram representing a general description of the digital processing and transmission scheme of the instant invention.

A flow diagram of one embodiment of the digital compression and transmission scheme of the invention is shown is FIG. 3. Each of the signal components is fed through a separate analog to digital converter (A/D) which uses a sampling frequency approximately twice the bandwidth of the respective signal component. In this way the lowest possible number of samples/sec is obtained before coding. The analog augmentation signal components $Y_p$, $Q_p$, $I_p$, LD and YH are bandlimited as described in Table 1. Like the applications cited herein, the augmentation signal of the instant invention utilizes a line period of approximately 127 $\mu$s and better known and described in these applications as a "superline". Table 1 shows how the number of Megasamples/sec. is computed for each of the signal components. After sampling, each of the digital signal components is converted into a stream of 8 bit pixels or samples 52. The resulting number of megasamples/sec for the signal components is 2.54 MS/sec, 0.36 MS/sec, 0.72 MS/sec, 2.74 MS/sec, and 2.46 MS/sec for $Q_p$, $I_p$, LD, and YH, respectively. The digital signal components are then passed through separate coders labeled CoderP, CoderQ, CoderI, CoderLD, and CoderYH 53. Average resulting compression rates are about 1.0 bits/pixel for $Y_p$, $I_p$ and $Q_p$. Rates of about 0.2 bits/pixel for LD and about 0.3 bits/pixel for YH have also been achieved. The digital signal components are then multiplexed into a single bit stream 55. Based on previous computations of MS/sec and average compression rates, this bit stream will have bit rate of about 4.91 Megabits/sec. With an additional overhead of 20% added for error protection (see below) the bitrate is 5.89 M6/sec. Computation of bit rate for each of the signal components and the combined signal is illustrated by Table 2. The column of Table 2 marked "Coding Rate" indicates the operating rate of the system for each of the signal components. This constraint is imposed on each coder.

Conventional error protection/compensation methods can be used 56 to process the bit stream prior to modulation and transmission in order to mitigate the effects of noise in the transmission channel medium. The bit stream can be transmitted in a 3 MHz wide RF channel using for example a 2 bit/sec./Hz QPSK transmission scheme 58.

At the receiving end, the QPSK bit stream is received and demodulated 60, and any error protection/compensation method used is compensated for 62. The demodulated bit stream is then demultiplexed into individual compressed digital augmentation signal components $Y_p$, $Q_p$, $I_p$, LD and YH 64. These compressed signals are then decoded by passing each signal through its own decoder 66. The recovered digital augmentation signal components can now be converted back into analog form and fed into a 2 channel decoder which is fully described in for example, the '968 application 68.

Figure 4A:
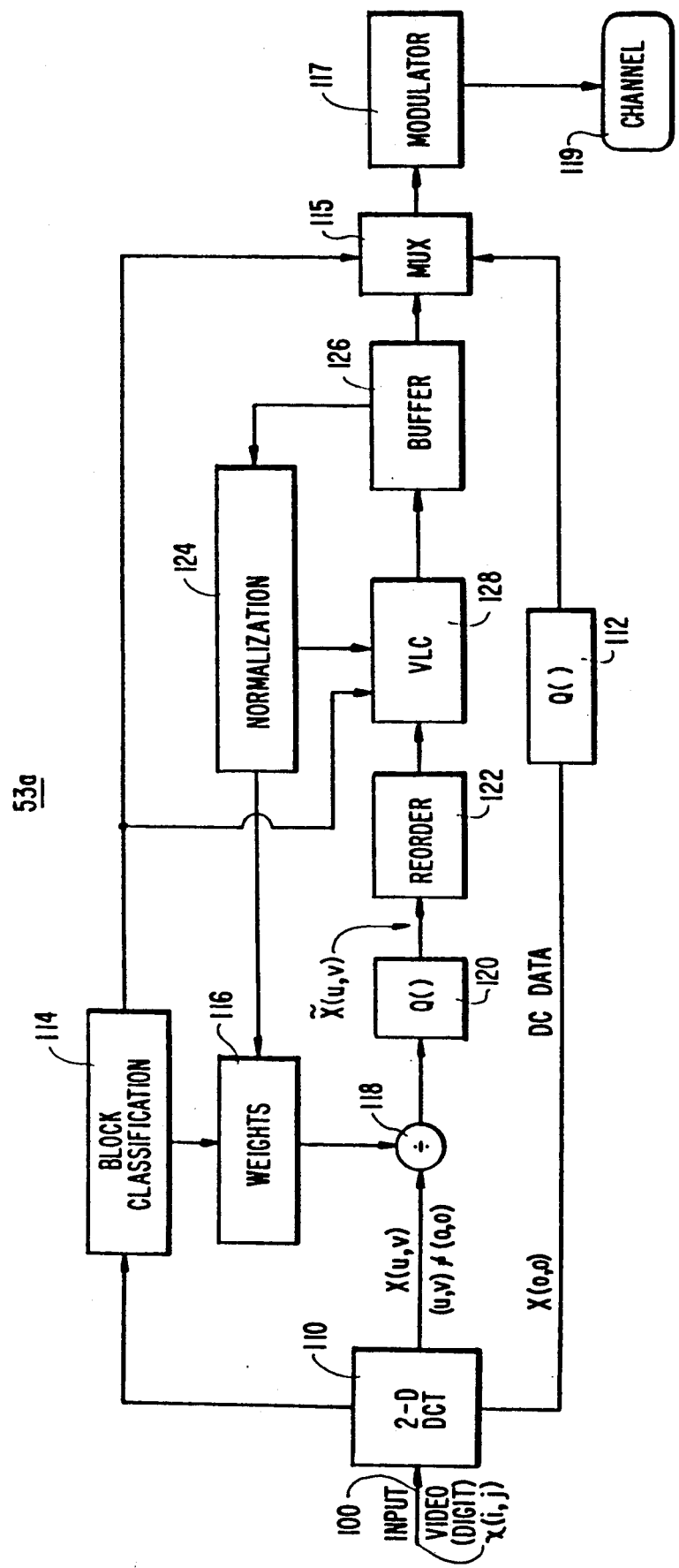
FIG. 4a describes one embodiment of a coder for the panel information.

The block diagram of an embodiment of a coder for panel information, i.e. $Y_p$, $I_p$, or $Q_p$, is shown in FIG. 4a. The panels from two consecutive fields are combined to produce one panel frame. More specifically, the even numbered lines of even numbered fields are interleaved with odd numbered lines of odd numbered fields. The resulting combination is regarded as one frame of panels and focus the input 100 of the panel encoder 53a. The frame is partitioned into separate blocks of equal size N, where N=16 and two-dimensional (2-D) discrete cosine transform (DCT) processing is applied separately and independently on each block using transform means 110.

The coder 53a operates on a block by block basis and performs the same series of operations on each block. Its operation therefore, will be described only for one block represented by x(i,j). Here, we will assume that the blocks in one frame are indexed from left to right and top to bottom (i.e., similar to a raster scan format) and the indexing is continued in a similar fashion for subsequent frames. After the 2-D DCT transformation, the dc coefficient, X(O,O), which represents the average gray level or luminance of the block, is separately quantized using for example a 9-bit quantizer 112 (a simple float to integer rounding operation), the output of which is then provided to multiplexer 115. The rest of the coefficients X(u,v), where $\{u,v=0,1, \ldots ,N-1;(u,v)\neq(0,0)\}$, are treated separately as described below. The activity of each block, which is indicative of amount of detail (for example edge content) of the block, is then calculated and classified using block classification means 114 according to the formula:

$$A(m,n) = max|X(u,v)|$$
$$(u,v)\neq(0,0)$$
$$u,v\{0,1,\ldots,N-1\},$$

where A(m,n) represents the activity of the block (m,n). The block is then assigned to one of K=4 activity classes, using a fixed set of decision levels $$0=\tau_0<\tau_1=10<\tau_2=25<\tau_3=50<\tau_4=255.$$

That is, block (m,n) is assigned to class k if $\tau_{k-1} \leq A(m,n) < \tau_k$. The assigned class of the block requires two bits ($\log_2 4$) of information to be uniquely identifiable. The assigned class along with the normalization factor, (described below) are then used to select a set of weights suitable for that class and normalization factor. Selection of the appropriate weights takes place using weighting means 116. The weights associated with all coefficients indexed by $n=(u+v)/2$, where $n=0,1,\ldots,2(N-1)$ are calculated according to the formula:

$$\omega_i(n) = \omega_i(N-1) + [\omega_i(N-1)-1](n-N+1)/(kN),$$

where i indicates the block number or the operating state. Calculation of these weights is illustrated by the graph of FIG. 1. As is clear from the previous expression, the weight assigned to each coefficient depends on the calculated value of $\omega_i(N-1)$, referred to as the central coefficient or the normalization factor which is in turn evaluated using normalization means 124 according to formula $$\omega_i(N) = f(\omega_{i-1}(N), b_s).$$

Figure 6:
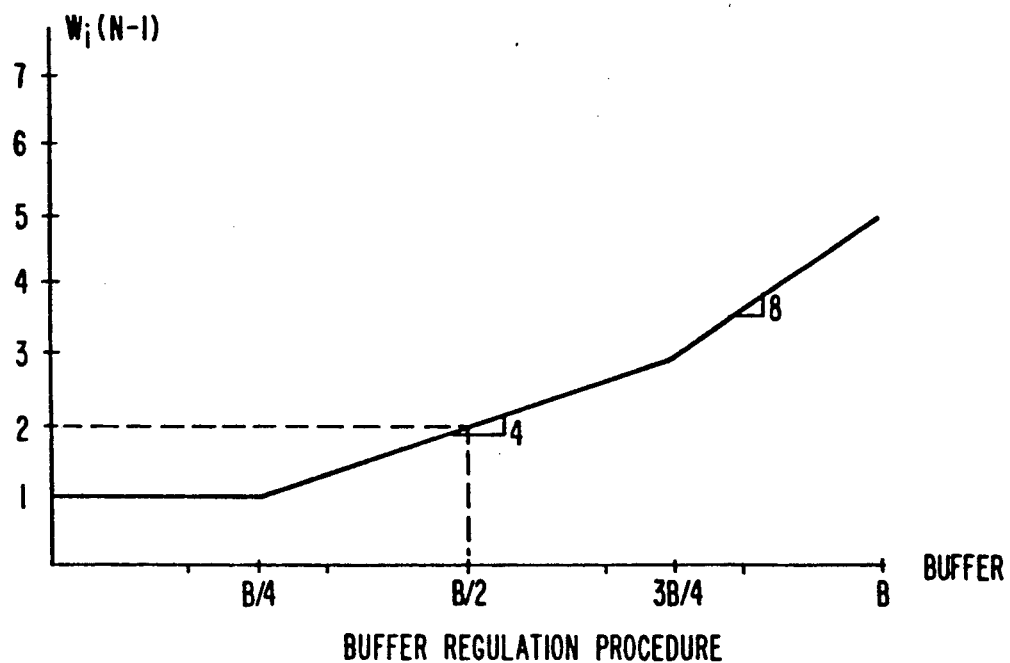
FIG. 6 is a graph representing the buffer regulation procedure.
Figure 7:
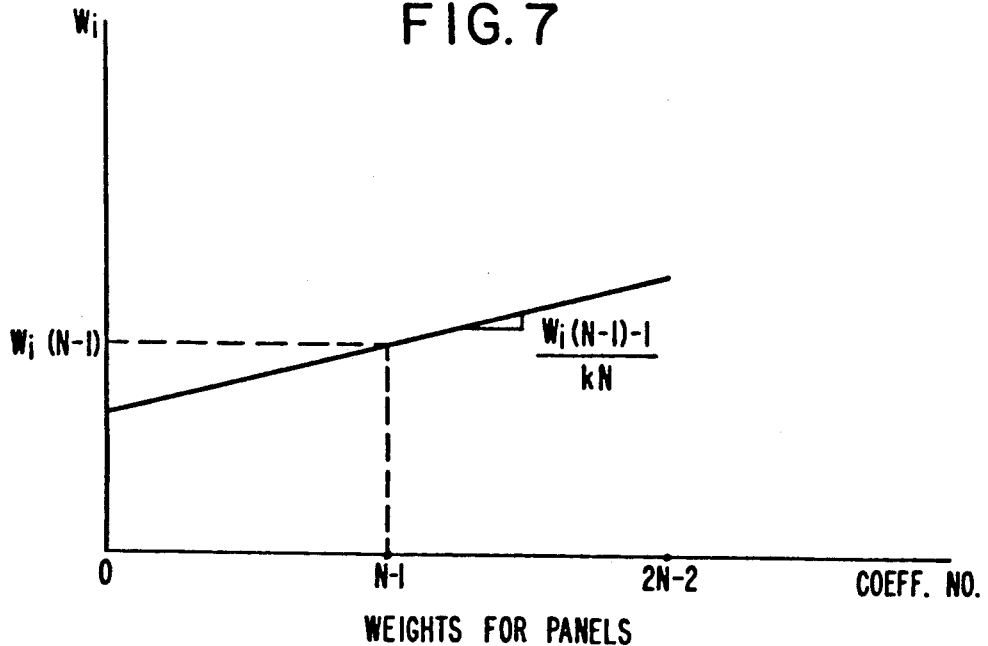
FIG. 7 is a graph describing the criteria for determining the weights for panel information.

Here, f(.) is a piece-wise linear function having a buffer status ($b_s$) as shown in the graph of FIG. 6. The buffer status is described as the ratio of number of bits in the buffer 12 to the buffer size.

Figure 5:
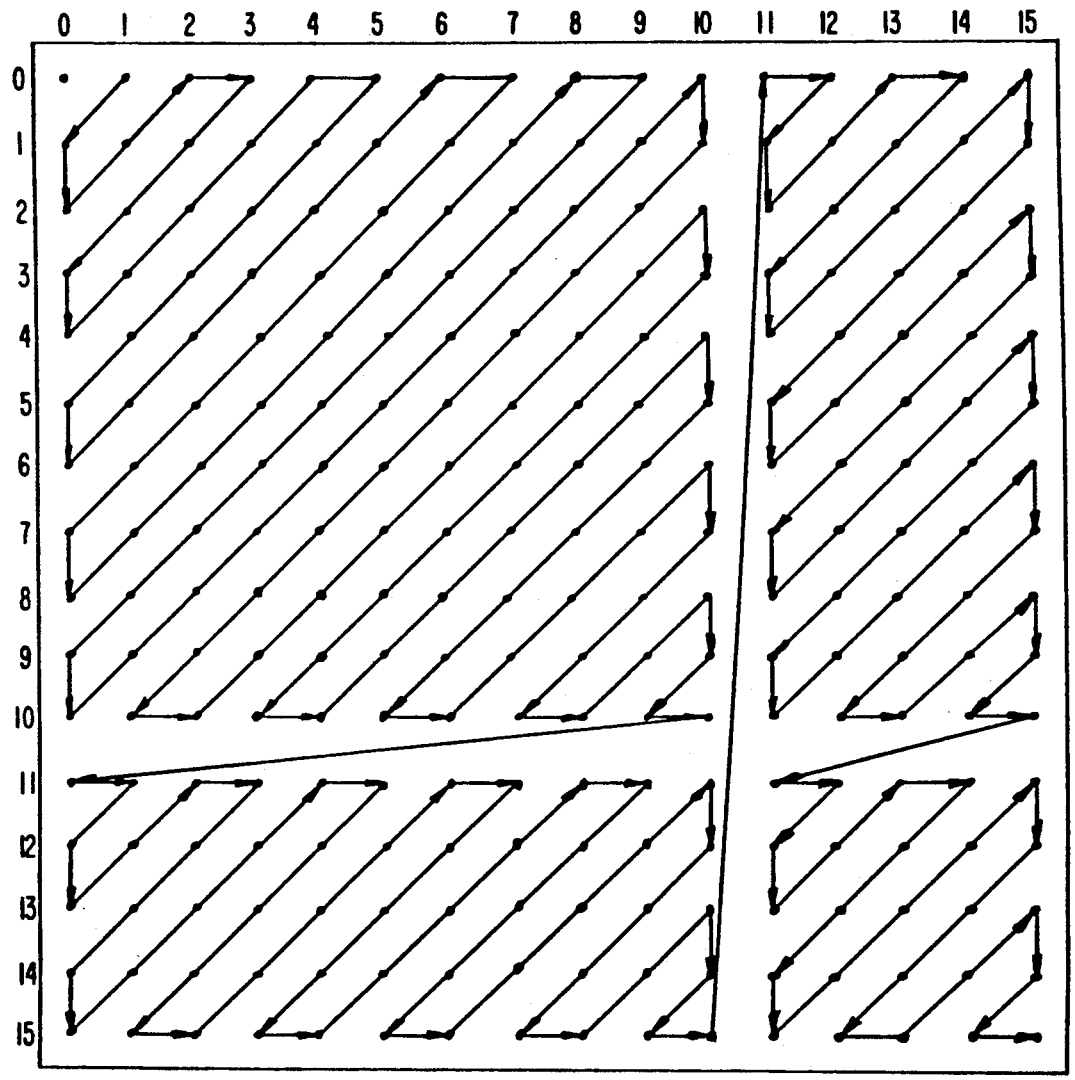
FIG. 5 describes the reordering of processed panel information.

All the transform coefficients, except for the dc coefficient, are divided by the weights calculated as above 118 and then quantized using a simple float to integer rounding operation in quantizer 120. The output of the quantizer 120, $\tilde{X}^{(u,v)}$, can then be reordered (scanned) 122 using the pseudo zig-zag scanning pattern illustrated in FIG. 5 in order to provide better match for the variable-length coder (VLC) 120.

The VLC 128 consists of several tables, each designed for a specific normalization value, $\omega_i(N-1)$, and activity class, k. The normalized values provide a better match to input statistics than previously provided by single coders such as those described by the prior art. The appropriate table, selected based on the normalization value and class assignment, is then used to encode $\tilde{X}^{(u,v)}$ to the VLC 128. The output of VLC 128 is fed to buffer 126 for further preparation (channel coding and modulation) for transmission. The status ($b_s$) of the buffer 126 is then updated and the normalization value for the next block, i+1, is calculated using normalization means 124. The output of buffer 126 is combined with the output of quantizer 112 and the respective block class provided by block classification means 114, in multiplexer 115. The multiplexed output is then modulated on to a carrier in modulator 117 and transmitted over part (i.e. 3 MHz) of a television channel 119.

The role of the decoder 536, in the absence of transmission errors, is to recover the digital signal components input to the coder 53a, allowing for some degradation due to quantization depending on the operating rate of the system.

Figure 4B:
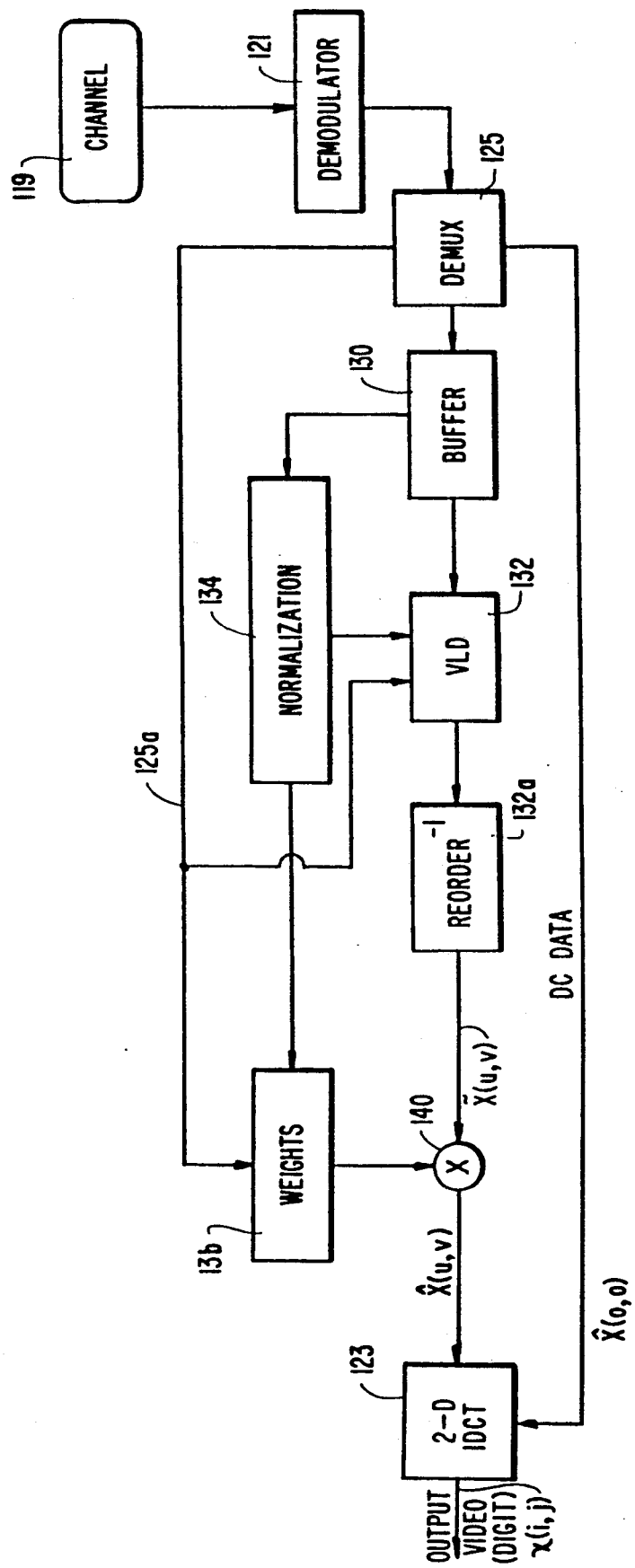
FIG. 4b describes one embodiment of a decoder for panel information.

FIG. 4b describes one embodiment of a decoder for panel information, i.e. $Y_p$, $I_p$ or $Q_p$. The information on channel 119 is demodulated by demodulator 121 and the dc coefficient $\tilde{X}^{(0,0)}$ is separated from the rest of the coefficients and the respective assigned block class in demultiplexer 125 and provided to inverse DCT transformation means 123. The rest of the demultiplexed coefficients are input to buffer 130. The output of the buffer 130 is fed to the variable-length decoder (VLD) 132 while the status of the buffer 130 is used to calculate, using normalization means 134, the normalization value used in the coder 53a. The respective assigned block class is provided from demultiplexer 125 to weighting means 136. The normalization value from 134 and the assigned block class 125a from demultiplexer 125 are input to and thereby enable the VLD 132 to select the table used in the VLC 128 and therefore to recover the value of the coefficients, $\tilde{X}^{(u,v)}$. The resulting coefficients are then processed 132a to compensate for any reordering process used during encoding. Weighting means 131 derives the weight factors used in encoder 53a for the coefficients (using the block class and normalization factors) and these factors are then combined in multiplier 140 with the processed coefficients from VLD 132. Along with the dc coefficient, $\tilde{X}(0,0)$, coefficients $\tilde{X}(u,v)$ are inverse transformed in inverse DCT means 123 to provide the output of the decoder $\tilde{x}(i,j)$.

Figure 8:
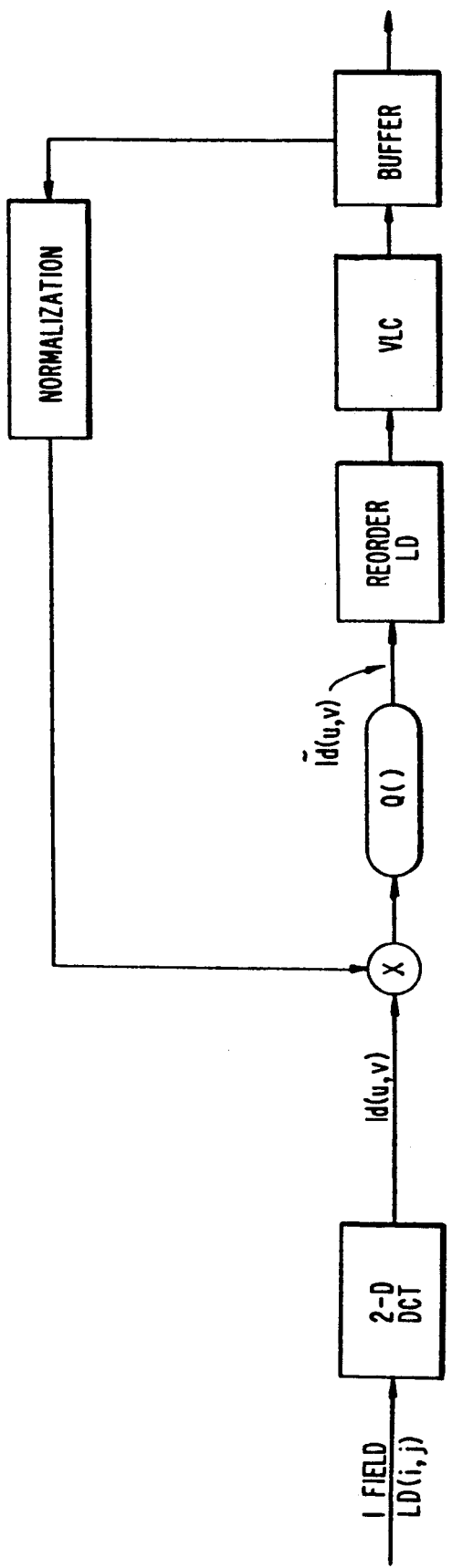
FIG. 8 describes one embodiment of an LD encoder.
Figure 9:
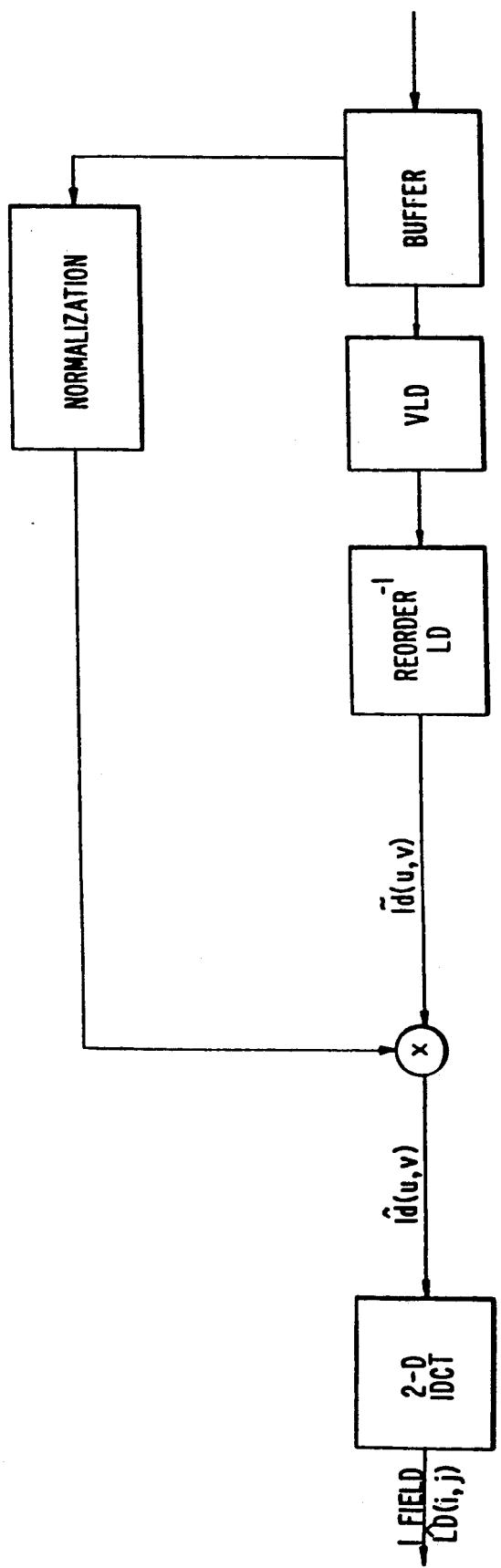
FIG. 9 describes one embodiment of an LD decoder.
Figure 10:
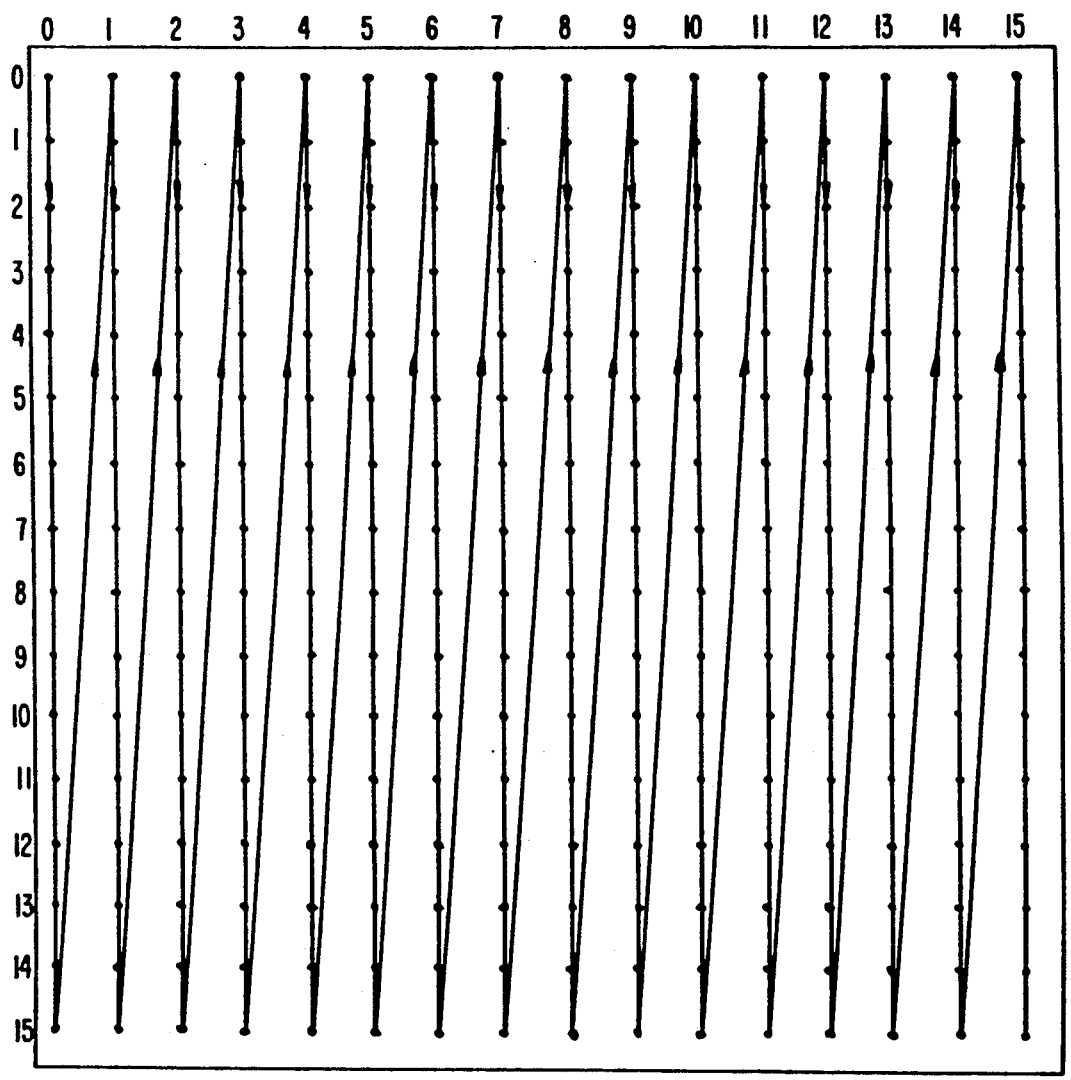
FIG. 10 describes the reordering of LD information.

The encoding and decoding procedures for LD components are similar to those for the panel components as shown in block diagrams FIGS. 8 and 9. Because of peculiar nature of the LD component, there is no weighting of the DCT coefficients. That is, all the coefficients are normalized using the same normalization value. In addition, the (0,0) coefficient in DCT domain is treated the same as the rest of coefficients. Furthermore, the reordering method used for LD is chosen to better suit the statistical properties of this signal and is shown in FIG. 10. Test results showed that the value of the normalization factor is usually small and therefore only one codebook is used in the VLC and the normalization value is taken as a real number.

Figure 11:
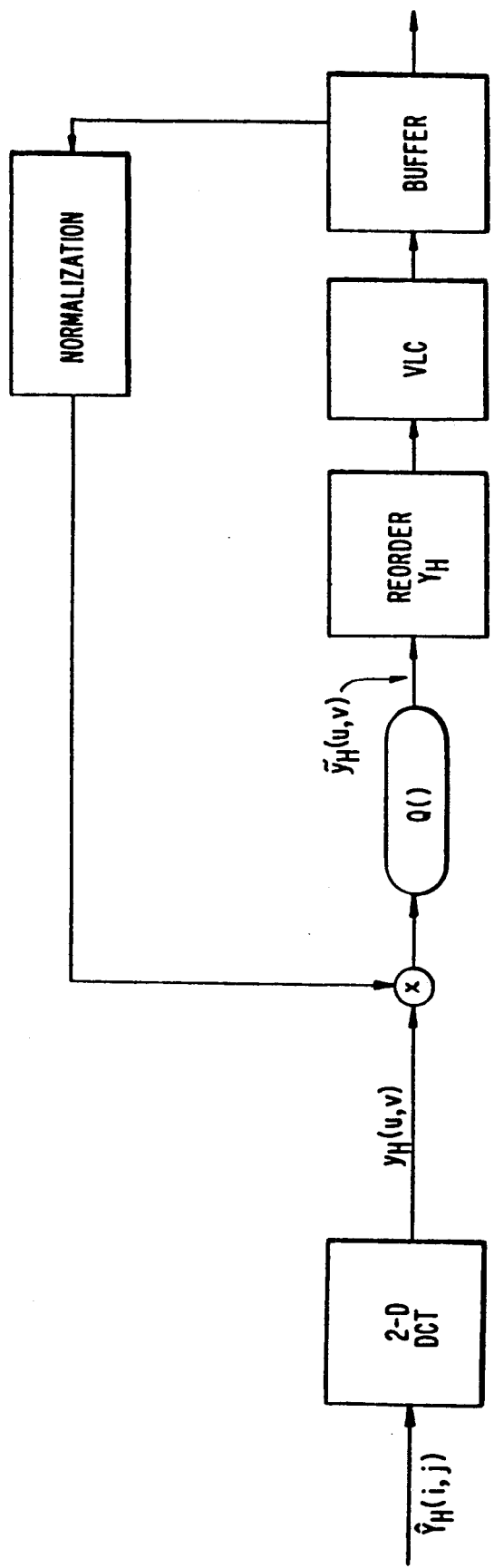
FIG. 11 describes one embodiment of a YH coder.
Figure 12:
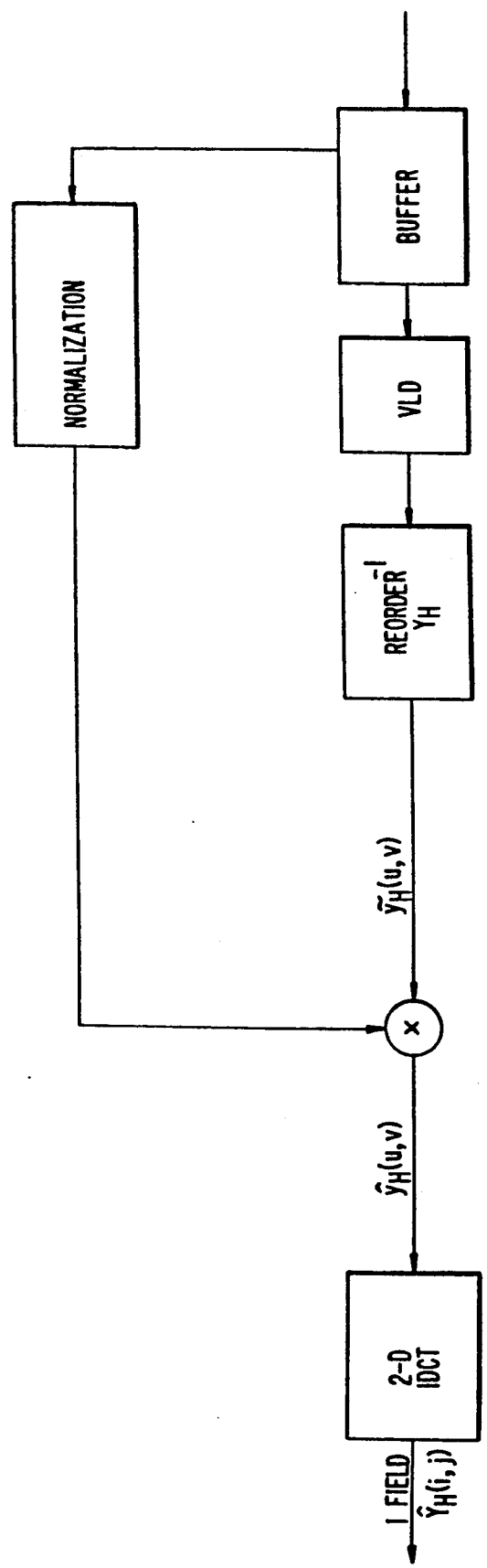
FIG. 12 describes one embodiment of a YH decoder.
Figure 13:
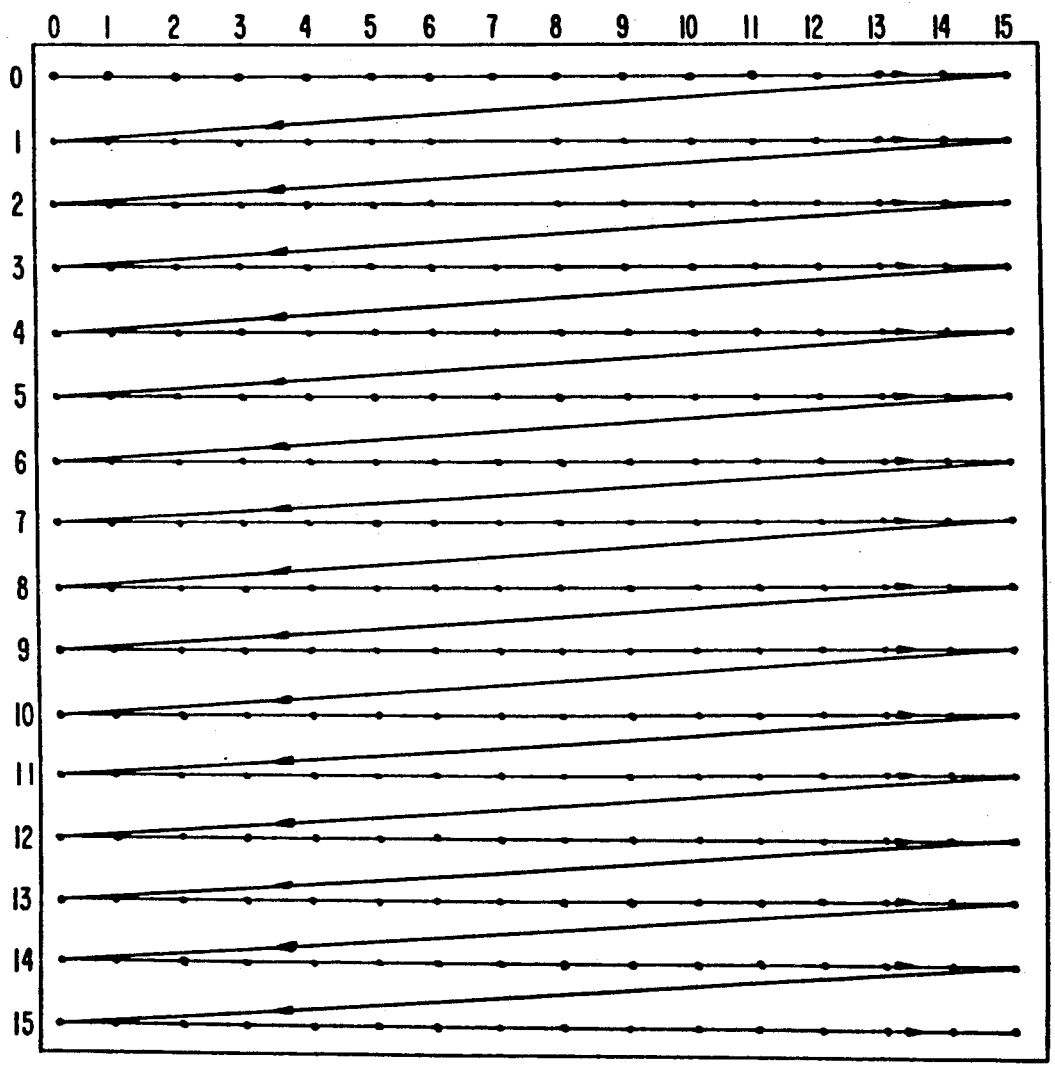
FIG. 13 describes the reordering of YH information.

Block diagrams representing the operation of embodiments of an encoder and decoder for YH are shown in FIGS. 11 and 12. The operation of the encoder for YH is very similar to that for LD except that the reordering process, shown in FIG. 13, is selected to better suit the properties of the YH component. In the above described embodiments, the means for transforming, normalizing weighting and variable length encoding/decoding the signal components can be accomplished using hardware or a computer program. Persons skilled in the art will be able to provide the means shown and use them in accordance with the instant invention.

The foregoing disclosure and description of the invention is illustrative and explanatory thereof and various changes in the details of the embodiments shown may be made within the scope of the appended claims without departing from the spirit of the invention.

TABLE 1

MEGASAMPLES/SEC COMPUTATIONS

| Signal | Line time | Bandwidth | Sampling Rate | MS/sec |
|---|---|---|---|---|
| PL & PR $Y_P$ | 2 × 7 μsec | 11.2 MHz | 23.0 MHz | 23*14/127 = 2.54 MS/sec |
| PL & PR $Q_P$ | 2 × 7 μsec | 1.6 MHz | 3.3 MHz | 3.3*14/127 = 0.36 MS/sec |
| PL & PR $I_P$ | 2 × 7 μsec | 3.2 MHz | 6.5 MHz | 6.5*14/127 = 0.72 MS/sec |
| LD | 2 × 26 μsec | 3.3 MHz | 6.7 MHz | 6.7*52/127 = 2.74 MS/sec |
| YH | 26 μsec | 5.6 MHz | 12.0 MHz | 12*26/127 = 2.46 MS/sec |

TABLE 2

BITRATE COMPUTATIONS

| Signal | Coding Rate | MS/sec | Bit Rate |
|---|---|---|---|
| PL & PR | 1.0 Bits/pel | 2.54 MS/sec | 1.0*2.54 = 2.54 Mb/sec |
| PL & PR Q | 1.0 Bits/pel | 0.36 MS/sec | 1.0*0.36 = 0.36 Mb/sec |
| PL & PR I | 1.0 Bits/pel | 0.72 MS/sec | 1.0*0.72 = 0.72 Mb/sec |
| LD | 0.2 Bits/pel | 2.74 MS/sec | 0.2*2.74 = 0.55 Mb/sec |
| YH | 0.3 Bits/pel | 2.46 MS/sec | 0.3*2.46 = 0.74 Mb/sec |
| TOTAL | | | 4.91 Mb/sec + 20% = 5.89 Mb/sec |

We claim:

1. A method for digitally processing a high definition television (HDTV) signal comprised of a plurality of signal components, said method comprising the steps of:
   a) deriving said signal components from a high definition television source;
   b) digitizing said signal components forming thereby a plurality of digitized components and;
   c) compressing each of said digitized components in a coder optimized for its respective digitized component.

2. The method of claim 1 wherein each said coder compresses its respective digitized component using a discrete cosine transform process and a variable length coding process.

3. The method of claim 1 wherein said signal components comprise at least one luminance component and at least one chrominance component.

4. An apparatus for digitally processing an HDTV signal comprised of a plurality of signal components, said apparatus comprising:
   a) means for deriving said signal components from a high definition television source;
   b) digitizing means coupled to said deriving means for digitizing said signal components forming thereby a plurality of digitized components and
   c) coding means coupled to said digitizing means for compressing each of said digitized components in a manner optimized for each of said respective components.

5. The apparatus of claim 4 wherein each of said coding means compresses its respective digitized component using a discrete cosine transform process and a variable length coding process.

6. The apparatus of claim 4 wherein said signal components comprise at least one luminance component and at least one chrominance component.

7. A system for transmitting a television signal, comprising:
   a) means for deriving a plurality of signal components from a television source signal;
   b) digitizing means coupled to said deriving means for digitizing said signal components so as to form a plurality of digitized components; and
   c) coding means coupled to said digitizing means for compressing each of said digitized components in a manner optimized for each of said respective components.

8. A receiver for receiving the digitized components provided by the transmitting system of claim 7, comprising:
   a) means for decoding each of said digitized components in a manner optimized for each of said respective components so as to form a plurality of decoded components; and
   b) means for combining said decoded components into a television display.

9. A system for transmitting an HDTV signal wherein an HDTV source signal is divided into a conventional television signal and an augmentation signal and said augmentation signal comprises a plurality of digitized signal components, said system comprising:
   a) means for deriving from said HDTV source signal a plurality of augmentation signals;
   b) means coupled to said deriving means, for digitizing said augmentation signal so as to form said plurality of digitized components; and
   c) means coupled to said digitizing means for compressing each of said digitized components in a manner optimized for each of said respective components.

10. A receiver for receiving the digitized components derived by the transmitting system of claim 9, comprising:
    a) means for decoding each of said digitized components in a manner optimized for each of said respective component so as to form a plurality of decoded components; and
    b) means combining said decoded components into an HDTV display.

11. A receiver for receiving a plurality of digitized components each representing respective signal components derived from a television signal and processed in a manner optimized for each of said respective components, said receiver comprising:
    a) means for decoding each of said digitized components in a manner optimized for each of said respective components so as to form a plurality of decoded components; and
    b) means for combining said decoded components into a television display.

* * * * *

UNITED STATES PATENT AND TRADEMARK OFFICE
CERTIFICATE OF CORRECTION

PATENT NO.  : 5,128,758
DATED       : July 7, 1992
INVENTOR(S) : FARAMARZ AZADEGAN, EBERHARD H. FISCH, ALAN P. CAVALLERANO and MIKHAIL TSINBERG It is certified that error appears in the above-identified patent and that said Letters Patent is hereby corrected as shown below:

```
On the title page, item (75) inventors, should read:

-- Alan P. Cavallerano, Ossining, New York;
                  Mikhail Tsinberg, Riverdale, New York--
```

Signed and Sealed this

Seventeenth Day of August, 1993

Attest:

BRUCE LEHMAN

*Attesting Officer*   *Commissioner of Patents and Trademarks*